US012493685B2

(12) United States Patent
Anemone et al.

(10) Patent No.: US 12,493,685 B2
(45) Date of Patent: Dec. 9, 2025

(54) METHOD AND APPARATUS FOR TESTING A DEVICE UNDER TEST

(71) Applicant: Sony Group Corporation, Tokyo (JP)

(72) Inventors: Fabiano Anemone, Stuttgart (DE); Alexei Karpov, Stuttgart (DE); Cederic Laumen, Stuttgart (DE); Stefan Rabin, Stuttgart (DE); Geoffrey Van Den Berge, Stuttgart (DE); Simon Gillet, Stuttgart (DE)

(73) Assignee: SONY GROUP CORPORATION, Tokyo (JP)

( * ) Notice: Subject to any disclaimer, the term of this patent is extended or adjusted under 35 U.S.C. 154(b) by 412 days.

(21) Appl. No.: 17/689,988

(22) Filed: Mar. 9, 2022

(65) Prior Publication Data
US 2022/0300604 A1 Sep. 22, 2022

(30) Foreign Application Priority Data
Mar. 16, 2021 (EP) .................................... 21162788

(51) Int. Cl.
*G06F 21/53* (2013.01)
(52) U.S. Cl.
CPC ........ *G06F 21/53* (2013.01); *G06F 2221/034* (2013.01)
(58) Field of Classification Search
None
See application file for complete search history.

(56) References Cited

U.S. PATENT DOCUMENTS

| 7,707,019 | B1 * | 4/2010 | Ballagh ................. G06F 30/331 703/13 |
| 8,060,876 | B2 * | 11/2011 | Smith ..................... G06F 21/57 718/1 |
| 9,768,893 | B1 * | 9/2017 | Wank ................. H04B 17/0085 |
| 10,534,906 | B1 | 1/2020 | Paithane et al. |
| 10,791,459 | B1 * | 9/2020 | Hu ......................... H04W 8/245 |
| 11,226,370 | B1 * | 1/2022 | Mendelson ......... G06F 11/3688 |
| 2003/0105606 | A1 * | 6/2003 | Poley .................. G06F 11/2294 714/E11.173 |

(Continued)

FOREIGN PATENT DOCUMENTS

| CN | 110008125 A | * | 7/2019 | .......... G06F 11/3688 |
| KR | 101595064 B1 | | 2/2016 | |

OTHER PUBLICATIONS

Paithane et al., "Detection Efficacy of Virtual Machine-based Analysis with Application Specific Events", Retrieved on: Dec. 29, 2020, 2 pages.

(Continued)

*Primary Examiner* — Michael Pyzocha
(74) *Attorney, Agent, or Firm* — XSENSUS LLP

(57) ABSTRACT

A method for testing a Device Under Test (DUT) is provided. The method includes emulating a Trusted Execution Environment (TEE) of the DUT by means of a software emulator in order to provide an emulated TEE. The method further comprises intercepting at the DUT a call from a Rich Execution Environment (REE) of the DUT into the TEE of the DUT. In addition, the method includes transmitting the call to the emulated TEE such that the call is processed by the emulated TEE. The method includes transmitting a response of the emulated TEE to the REE. The response is based on the call.

19 Claims, 2 Drawing Sheets

(56) References Cited

U.S. PATENT DOCUMENTS

| | | | |
|---|---|---|---|
| 2004/0072591 A1* | 4/2004 | Andreini | H04W 24/00 |
| | | | 455/558 |
| 2005/0131671 A1* | 6/2005 | Kashyap | G06F 21/35 |
| | | | 703/24 |
| 2005/0138370 A1* | 6/2005 | Goud | G06F 21/53 |
| | | | 713/188 |
| 2009/0165117 A1* | 6/2009 | Brutch | G06F 21/57 |
| | | | 726/14 |
| 2009/0169020 A1* | 7/2009 | Sakthikumar | H04L 63/061 |
| | | | 380/278 |
| 2010/0082315 A1* | 4/2010 | Hall | G06F 11/261 |
| | | | 703/13 |
| 2011/0320816 A1* | 12/2011 | Yao | G06F 21/32 |
| | | | 713/176 |
| 2012/0108294 A1* | 5/2012 | Kaul | G06K 7/0013 |
| | | | 455/558 |
| 2013/0155083 A1* | 6/2013 | McKenzie | G06F 9/45558 |
| | | | 345/522 |
| 2013/0219508 A1 | 8/2013 | Lee et al. | |
| 2017/0024500 A1* | 1/2017 | Sebastian | H04W 4/046 |
| 2017/0277891 A1* | 9/2017 | Keppler | H04L 63/1491 |
| 2018/0082065 A1* | 3/2018 | Liu | H04L 9/3247 |
| 2018/0203713 A1* | 7/2018 | Elfering | G06F 9/4411 |
| 2018/0225446 A1 | 8/2018 | Liu et al. | |
| 2018/0330081 A1* | 11/2018 | Hua | G06F 9/4812 |
| 2019/0087245 A1 | 3/2019 | Yamaura | |
| 2019/0108116 A1* | 4/2019 | Benes | G06F 21/552 |
| 2020/0143041 A1* | 5/2020 | Jung | G06F 21/71 |
| 2020/0183903 A1* | 6/2020 | Wilkinson | G06F 11/302 |
| 2020/0366653 A1* | 11/2020 | Caceres | H04L 63/0853 |
| 2021/0157712 A1* | 5/2021 | Kalbac | G06N 3/08 |
| 2023/0115278 A1* | 4/2023 | Turner | G06F 11/1469 |
| | | | 718/1 |

OTHER PUBLICATIONS

Lee et al., "Method and Apparatus for Outputting Content in Portable Terminal Supporting Secure Execution Environment", Retrieved on: Dec. 29, 2020, 1 page.

Yamaura, "Notification Control Device, Notification Control Method, and Computer Program Product", Retrieved on: Dec. 29, 2020, 2 pages.

Liu et al., "Processor Trace-Based Enforcement of Control Flow Integrity of a Computer System", Retrieved on: Dec. 29, 2020, 2 pages.

* cited by examiner

METHOD AND APPARATUS FOR TESTING A DEVICE UNDER TEST

CROSS-REFERENCE TO RELATED APPLICATION

The present application claims priority to European Patent Application No. 21162788.0, filed Mar. 16, 2021, the entire contents of which are incorporated herein by reference.

FIELD

The present disclosure relates to device testing. In particular, examples relate to a method and an apparatus for testing a Device Under Test (DUT).

BACKGROUND

Many modern systems need a secure way to perform sensitive operations such as using Digital Rights Management (DRM) keys or using personal identifiable information. These operations are only allowed to be processed by processes with high privileges such as the kernel.

For performing sensitive operations, systems may switch between a secure/trusted world and a normal world. To effectively reduce the attack surface of the secure/trusted world, normal operations are almost always executed in the normal world. On the other hand, smaller specialized code is executed in the secure world, which often has the purpose of DRM functionality or verifying the integrity of the normal world. Because of the security boundary, the confidentiality and integrity of the secure world is guaranteed, even if the entire normal world is compromised.

The hardware of the secure/trusted world is isolated from the hardware of the normal world. Because of the hardware isolation, it can be very difficult to properly assess the security of the code being executed in the secure world. Due to legal or technical requirements, it is not always possible to provide the source code, meaning that most tests are performed "blackbox". Dynamic analysis is infeasible because of the closed-source nature of the secure world. Only code approved by the vendor can execute in the secure world, making it impossible to inject dynamic instrumentation tools without a prior vulnerability in the code. Additionally, no debug capabilities are provided to aid in debugging the code. As such, only static analysis of the code is possible, but this provides other challenges. Obtaining a copy of the secure/trusted world image can be very difficult, after which the code can be encrypted or obfuscated, hindering analysis.

Hence, there may be a demand for improved device testing.

SUMMARY

This demand is met by apparatuses and methods in accordance with the independent claims. Advantageous embodiments are addressed by the dependent claims.

According to a first aspect, the present disclosure provides a method for testing a DUT. The method comprises emulating a Trusted Execution Environment (TEE) of the DUT by means of a software emulator in order to provide an emulated TEE. The method further comprises intercepting at the DUT a call from a Rich Execution Environment (REE) of the DUT into the TEE of the DUT. In addition, the method comprises transmitting the call to the emulated TEE such that the call is processed by the emulated TEE. The method comprises transmitting a response of the emulated TEE to the REE. The response is based on the call.

According to a second aspect, the present disclosure provides an apparatus for testing a DUT. The apparatus comprises interface circuitry for coupling to the DUT. Further, the apparatus comprises processing circuitry coupled to the interface circuitry and configured to execute a software emulator for emulating a TEE of the DUT in order to provide an emulated TEE. The processing circuitry is further configured to receive, via the interface circuitry, an intercepted call from a REE of the DUT into the TEE of the DUT. In addition, the processing circuitry is configured to process the intercepted call by the emulated TEE. Further, the processing circuitry is configured to control the interface circuitry to transmit a response of the emulated TEE to the REE. The response is based on the call.

According to a third aspect, the present disclosure provides a non-transitory machine-readable medium having stored thereon a program having a program code for performing the proposed method for testing a DUT, when the program is executed on a processor or a programmable hardware.

According to a fourth aspect, the present disclosure provides a program having a program code for performing the proposed method for testing a DUT, when the program is executed on a processor or a programmable hardware.

BRIEF DESCRIPTION OF THE FIGURES

Some examples of apparatuses and/or methods will be described in the following by way of example only, and with reference to the accompanying figures, in which.

DETAILED DESCRIPTION

Figure 1:
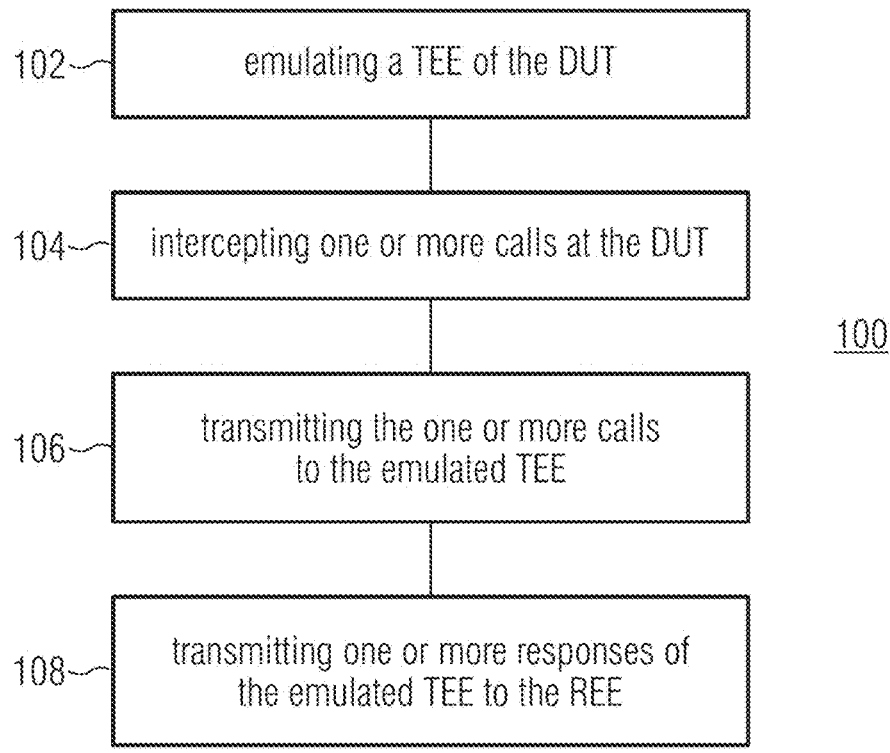
FIG. 1 illustrates a flowchart of an example of a method for testing a DUT.

Some examples are now described in more detail with reference to the enclosed figures. However, other possible examples are not limited to the features of these embodiments described in detail. Other examples may include modifications of the features as well as equivalents and alternatives to the features. Furthermore, the terminology used herein to describe certain examples should not be restrictive of further possible examples.

Throughout the description of the figures same or similar reference numerals refer to same or similar elements and/or features, which may be identical or implemented in a modified form while providing the same or a similar function. The thickness of lines, layers and/or areas in the figures may also be exaggerated for clarification.

When two elements A and B are combined using an "or", this is to be understood as disclosing all possible combinations, i.e. only A, only B as well as A and B, unless expressly defined otherwise in the individual case. As an alternative wording for the same combinations, "at least one of A and B" or "A and/or B" may be used. This applies equivalently to combinations of more than two elements.

If a singular form, such as "a", "an" and "the" is used and the use of only a single element is not defined as mandatory either explicitly or implicitly, further examples may also use several elements to implement the same function. If a function is described below as implemented using multiple elements, further examples may implement the same function using a single element or a single processing entity. It is further understood that the terms "include", "including", "comprise" and/or "comprising", when used, describe the presence of the specified features, integers, steps, operations, processes, elements, components and/or a group thereof, but do not exclude the presence or addition of one or more other features, integers, steps, operations, processes, elements, components and/or a group thereof.

FIG. 1 illustrates a flowchart of an exemplary method 100 method for testing a DUT.

The DUT comprises circuitry (hardware) comprising, e.g., processors, memories, signal lanes, etc. Part of the DUT's circuitry is isolated from the remaining circuitry of the DUT in order to provide a TEE. The TEE as an isolated execution environment provides security features such as isolated execution, integrity of applications/functions/routines/code executing with the TEE, along with confidentiality of their assets. The TEE is isolated from a REE of the DUT, i.e., a "normal" processing environment provided by the remaining circuitry of the TEE. For example, an Operating System (OS) of the DUT runs in the REE, whereas sensitive operations such as usage of DRM keys or usage of personal identifiable information run in the TEE. As the TEE is isolated from the REE, code and data loaded in the TEE are protected with respect to confidentiality and integrity. The TEE runs in parallel to the REE on the DUT. The DUT may, e.g., be a mobile device such as a mobile phone, a laptop-computer or a tablet-computer, an Internet-of-Things (IoT) device, an entertainment device such as television or a game console, a computer or a server.

The method 100 comprises emulating 102 the TEE of the DUT by means of a software emulator in order to provide an emulated TEE. The software emulator is a piece of software that emulates (imitates) the hardware and the code (software) of the DUT's TEE such that the software emulator behaves like the real TEE of the DUT. In other words, the emulated TEE imitates the behavior of the real TEE of the DUT. For example, the software emulator may emulate hardware of the DUT's TEE such as, e.g., a processor and one or more memories of the DUT's TEE, and run the code (software) of the DUT's TEE on the emulated hardware. In other words, the code (software) of the DUT's TEE is run in a virtualized environment. For example, QEMU may be used as the software emulator such that the TEE of the DUT is emulated in a QEMU session. The software emulator may run (be executed) on a computing device (e.g. a computer, a server or a dedicated programmable hardware component) different from the DUT. The software emulator may, e.g., emulate a secure monitor of the TEE, a kernel of the TEE and/or (user mode) applications of the TEE.

The method 100 further comprises intercepting 104 at the DUT a call from the REE of the DUT into the TEE of the DUT. A "call" is a piece of instructions (code, data) from the REE into the TEE for invoking one or more applications, one or more functions, one or more routines or other software components running in the TEE. For example, a call may be a Secure Monitor Call (SMC) or a HyperVisor Call (HVC). By intercepting 104 the call from the REE of the DUT, the call is obstructed so as to prevent it from continuing to the TEE of the DUT, which is its destination. The call may, e.g., be intercepted at the DUT by hooking. When hooking is used for intercepting 104 the call from the REE of the DUT, the behavior of the OS, of one or more applications, one or more functions, one or more routines or of other software components of the REE is augmented such that the call from the REE into the TEE of the DUT is intercepted.

In addition, the method 100 comprises transmitting 106 the call to the emulated TEE such that the call is received and processed by the emulated TEE. In other words, one or more applications, one or more functions, one or more routines or other software components running in the emulated TEE are invoked according to the intercepted call.

The method 100 further comprises transmitting 108a response of the emulated TEE to the REE. The response is based on the call. In other words, the emulated TEE generates the response based on the intercepted call. For example, the response may be output by the one or more applications, one or more functions, one or more routines or other software components called in the emulated TEE based on the intercepted call.

Emulating the TEE of the DUT by means of the software emulator may allow to completely control the emulated TEE with ease. This may allow (e.g. a researcher) to dynamically analyze emulated code (software) of the TEE. Further, the emulation of the TEE is completely transparent to the DUT as the response of the emulated TEE is fed back to the REE. Therefore, the DUT does not known that the TEE is emulated. Further, fake traffic (e.g. fake calls) need not be generated uniquely for the DUT as a real call from the DUT is intercepted and may be used for studying the behavior of the emulated TEE. This may allow a researcher a good overview over the usage of the TEE on the DUT, hence, providing unique insights that may be used to focus on high-risk functionalities.

For example, in case an external penetration testing service is hired by a manufacturer of the DUT to identify vulnerabilities in the DUT's TEE, the source code of the TEE usually cannot be provided due to legal issues. Conventionally, the options of the external penetration testing service to analyze the source code of the TEE are, hence, limited. As a consequence, the time and effort for analyzing the DUT's TEE are quite high, whereas the results may be quite limited. By using the method 100, the external penetration testing service is able to utilize dynamic analysis to aid their investigation. As the code (software) of the DUT's TEE is virtualized by means of the software emulator (e.g. QEMU) and the emulated TEE is coupled to the real DUT for intercepting the call and feeding back the response, the external penetration testing service is able to dynamically analyze the code (software) of the DUT's TEE and search for vulnerabilities. The method 100 may allow to significantly improve their testing speed, testing efficiency and testing results.

As the DUT's TEE is emulated by means of the software emulator (e.g. QEMU), virtualized (emulated) hardware of the DUT's TEE such as a virtualized processor may be halted at any time and its current (internal) state may be inspected. In other words, the method 100 may further comprise monitoring a state of at least part of the emulated hardware of the TEE while the call is processed by the emulated TEE. This allows a researcher to see and inspect the contents of all kinds of registers, memory, etc. at any desired point in time. As the virtualized (emulated) hardware of the DUT's TEE such as a virtualized processor may be interrupted at any time due to the software emulator such that the internal state may be inspected, a researcher is able to analyze the inner workings of the emulated TEE. Further, as a call from the real DUT is intercepted and as the response of the emulated TEE is fed back to the DUT, fake traffic (e.g. fake calls or responses) need not be generated. As generating fake traffic properly is difficult and time-consuming, the method 100 may allow to significantly reduce the complexity and efforts required for analyzing the DUT.

As the emulated environment, i.e., the emulated TEE may be completely controlled with ease, a researcher may dynamically analyze the code (software) of the emulated TEE with ease. For example, dynamic instrumentation tools may be injected into the software emulator (e.g. a QEMU session) to add hooks on, e.g., important functions, routines or other software components running in the emulated TEE. Further, the code (software) of the emulated TEE may be debugged using a debugger.

In other words, the method 100 may further comprise modifying the emulated code of the TEE based on a user input such that the response is generated by processing the call with the modified code. As described above, modifying the emulated code of the TEE may comprise hooking one or more functions of the emulated code as part of, e.g., a dynamic analysis of the emulated TEE. Further, modifying the emulated code of the TEE may comprise debugging the emulated code as described above.

Due to the emulation of the DUT's TEE by means of the software emulator, the current state of the TEE cannot only be inspected (monitored), the current state of the TEE may further be edited. For example, the code (software) of the emulated TEE may be modified as described above. Similarly, faults may be artificially introduced into the code (software) of the emulated TEE. This may, e.g., allow to test the error-handling capabilities of the DUT. In other words, modifying the emulated code of the TEE may comprise introducing an artificial error into the emulated code of the TEE. In other applications, modifying the emulated code of the TEE may comprise editing one or more components of an encryption code or algorithm of the emulated code of the TEE (e.g. an encryption key, an initialization vector, etc.). This may allow to test the DUT for cryptographic weaknesses (vulnerability).

The emulated TEE may be based on extracted code of the TEE. In other words, code (software) of the TEE may be extracted from the DUT's TEE and be emulated by the emulator software. For example, compiled code of the DUT's TEE may be extracted such that the extracted code of the TEE is compiled code. The code (software) of the TEE may be extracted in various ways from the DUT. For example, existing (known) vulnerabilities of the TEE or the DUT may be used. In other examples, direct memory attacks on the TEE during run-time may be used to extract the code (software) of the TEE. However, it is to be noted that the present disclosure is not limited to the above exemplary code extraction methods. In general, any suitable method may be used for extracting the code (software) of the TEE from the DUT. In other examples, the emulated TEE may be based on provided code of the TEE. For example, a vendor or manufacturer of the DUT may provide the code of the TEE (e.g. as binary code).

In some examples, the intercepted call may be properly translated before it is input to the emulated TEE so that the emulated TEE can process it correctly. Translating the intercepted call may allow to avoid time-consuming tasks during emulation.

Accordingly, transmitting 104 the call to the emulated TEE may comprise receiving the call from the DUT's REE. Further, transmitting 106 the call to the emulated TEE may comprise parsing (translating) the call in order to obtain input data in a predefined data format for the emulated TEE. Transmitting 106 the call to the emulated TEE may additionally comprise sending the input data to the emulated TEE. The input data may, e.g., comprise data on the call parameters and related metadata. For example, call parameters of the intercepted call may be parsed (translated) to processor registers, physical buffers, etc. used by a corresponding TEE call instruction. The emulated TEE may use the information on the processor registers, physical buffers, etc. to synchronize a virtualized memory, flush a virtualized processor data cache, populate registers, etc. for executing one or more instructions (e.g. an SMC instruction) according to the translated call. In other words, the emulated TEE may process the call by processing the obtained input data.

Additionally, the input data may be packed after parsing in order to generate packetized data for transmission to the emulated TEE. For example, the packetized data may be sent to the emulated TEE via one or more data networks such as a local area network, a wireless local area network, a cellular network and/or the internet. In other words, transmitting 106 the call to the emulated TEE may further comprise packing the input data prior to sending the input data to the emulated TEE.

Analogously, the response from the emulated TEE may be translated for synchronizing the DUT and the emulated TEE. Accordingly, transmitting 108 the response of the emulated TEE to the REE of the DUT may comprise receiving, from the emulated TEE, output data related to the response in a predefined data format. Further, transmitting 108 the response of the emulated TEE to the REE of the DUT may comprise parsing the output data in order to obtain the response in the data format used by the DUT's REE. Transmitting 108 the response of the emulated TEE to the REE of the DUT may additionally comprise sending the response in the data format used by the DUT's REE to the REE.

Similarly to what is described for the parsed call, also the output data from the emulated TEE may be packed for transmission. Accordingly, transmitting 108 the response of the emulated TEE to the REE may further comprise unpacking the output data prior to parsing the output data.

Figure 2:
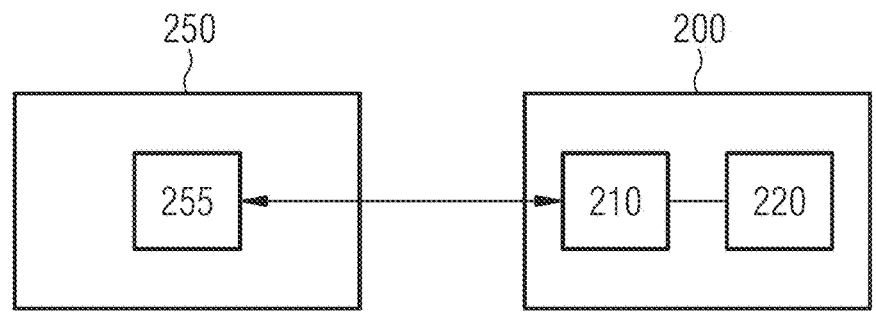
FIG. 2 illustrates a DUT and an example of an apparatus for testing the DUT.

FIG. 2 illustrates an exemplary apparatus 200 for testing a DUT according to the above-described principles of the proposed technique.

The apparatus 200 comprises interface circuitry 210 for coupling to the DUT 250. The interface circuitry 210 may be adapted for wireless coupling to the DUT 250 (e.g. according to a wireless communication standard such as IEEE 802.11 or IEEE 802.15.1 of the Institute of Electrical and Electronics Engineers, IEEE) or wired coupling to the DUT 250 (e.g. by means of a cable).

Similarly to what is described above, part of the DUT 250's hardware (circuitry) 255 provides a TEE, which is isolated from a REE of the DUT. The REE is provided by the remaining part of the DUT 250's hardware.

Further, the apparatus 200 comprises processing circuitry 220. For example, the processing circuitry 220 may be a single dedicated processor, a single shared processor, or a plurality of individual processors, some of which or all of which may be shared, a digital signal processor (DSP) hardware, an application specific integrated circuit (ASIC) or a field programmable gate array (FPGA). The processing circuitry 220 may optionally be coupled to, e.g., read only memory (ROM) for storing software, random access memory (RAM) and/or nonvolatile memory. The processing circuitry 220 is coupled to the interface circuitry 210 and used for performing the proposed method for testing a DUT.

In particular, the processing circuitry 220 is configured to execute a software emulator for emulating the TEE of the DUT 250 in order to provide an emulated TEE. The REE of the DUT 250 is augmented (manipulated) in order to intercept a call at the DUT from the REE of the DUT 250 into the TEE of the DUT 250. The processing circuitry 200 is configured to receive the intercepted call via the interface circuitry 210 from the REE of the DUT 250. For example, the call may be intercepted at the DUT 250 by hooking. In addition, the processing circuitry 220 is configured to process the intercepted call by the emulated TEE. Further, the processing circuitry 220 is configured to control the interface circuitry to transmit a response of the emulated TEE to the REE of the DUT 250. The response is based on the intercepted call.

Similarly to what is described above for the method 100, also the apparatus 200 may allow to completely control the emulated TEE with ease. This may allow (e.g. a researcher) to dynamically analyze emulated code (software) of the TEE. Further, the emulation of the TEE is completely transparent to the DUT 250 as the response of the emulated TEE is fed back to the REE. Therefore, the DUT 250 does not known that the TEE is emulated. Further, fake traffic (e.g. fake calls) need not be generated uniquely for the DUT 250 as a real call from the DUT 250 is intercepted and may be used for studying the behavior of the emulated TEE. This may allow a researcher a good overview over the usage of the TEE on the DUT 250, hence, providing unique insights that may be used to focus on high-risk functionalities.

The processing circuitry 220 may optionally be configured to perform one or more of the above-described further aspects of the method 100. For example, the processing circuitry 220 may be further configured to monitor a state of at least part of the emulated hardware of the TEE while the call is processed by the emulated TEE. In other examples, the processing circuitry 220 may be further configured to modify the emulated code of the TEE based on a user input such that the response is generated by processing the call with the modified code.

The apparatus 200 may comprise further hardware—conventional and/or custom.

Figure 3:
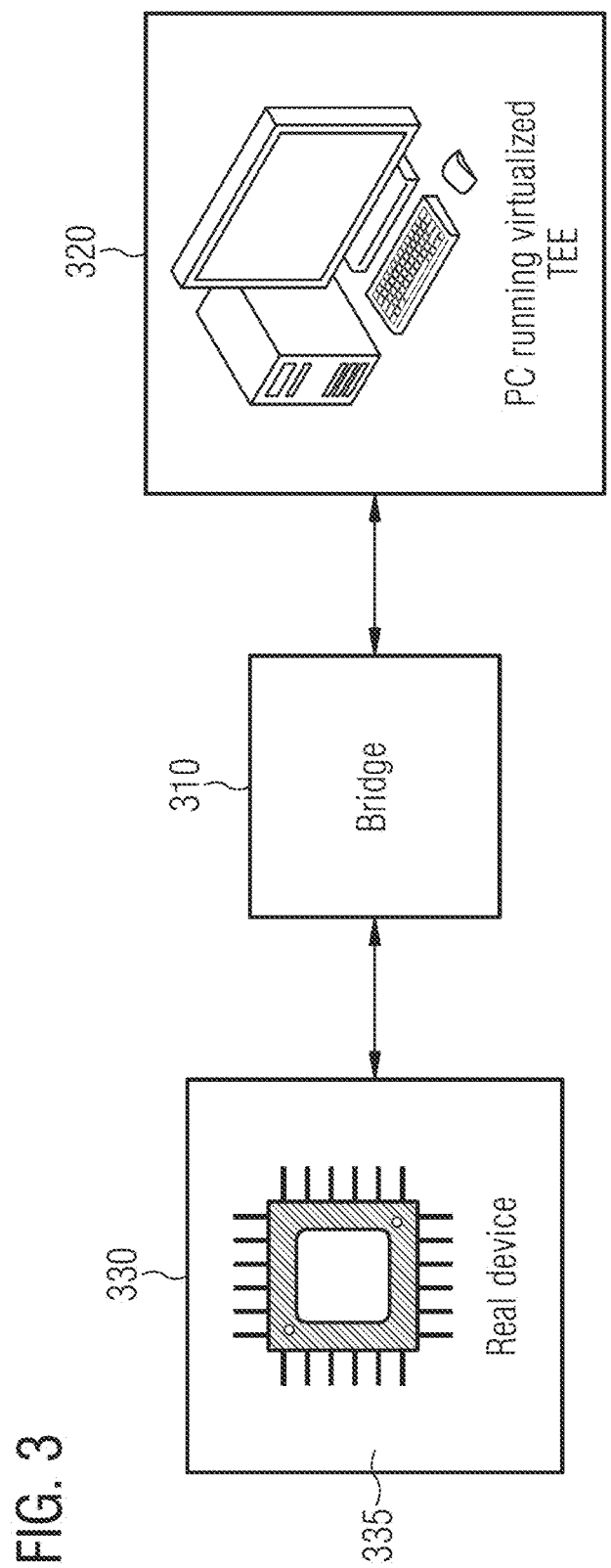
FIG. 3 illustrates a DUT and an exemplary system for testing the DUT.

FIG. 3 illustrates an exemplary system for testing a DUT 330 according to the proposed technique.

Similar to what is described above for the DUT 200, the DUT 330 comprises hardware (circuitry) 335. Part of the DUT 330's hardware provides a TEE, which is isolated from a REE of the DUT. The REE is provided by the remaining part of the DUT 330's hardware.

The system comprises a programmable hardware component 320 such as a computer that runs a software emulator for emulating the TEE of the DUT 330 (e.g. in a QEMU session). For example, code of the DUT 330's TEE may be extracted from the device 330 and emulated in a virtual environment provided by the software emulator. A bridge 310 (implemented by hardware and/or software) enables communication between the programmable hardware component 320 and the DUT 330. In other words, the virtual environment provided by the programmable hardware component 320 and the DUT 330 are linked using the bridge 310. The bridge 310 hooks the relevant functions on the DUT 330 to intercept all calls (e.g. a SMC or HVC instruction) to the secure world, i.e., the TEE of the DUT 330.

The intercepted calls are sent to the virtualized environment by the bridge 310 instead to the secure world, i.e., the TEE of the DUT 330. Before an intercepted call is sent to the virtualized environment, the call is properly translated so that emulated secure world, i.e., the emulated TTE running on the programmable hardware component 320 can process it correctly. For example, all calls into the secure world on the DUT 330 may be intercepted and translated into a common format, which can be understood by the emulated processor running the emulated TEE. Accordingly, the bridge 310 may ensure that the emulated secure world can process the call correctly.

Then, the call is forwarded to the software emulator emulating the TEE of the DUT 330 (e.g. a QEMU session), where it is executed on the emulated processor. The call is received by the virtualized TEE and the relevant code is executed. The return value is sent back to the bridge 310 where it is translated back to the original format and redirected back to the DUT 330.

The bridge 310 intercepts the return value that was sent by the virtualized TEE and translates it back so that the hardware 335 of the DUT 330 can properly process the return value.

A researcher may, e.g., place a hook to redirect control flow, a breakpoint to inspect the current state or modify the code of the emulated TEE at any point during emulation to gain unique information about how TEE is used by the DUT 330, and test for difficult vulnerabilities such as fault injection. The apparatus 300 may allow to speed up and increase the quality of, e.g., penetration tests on the DUT 330's TEE.

The following examples pertain to further embodiments:

(1) A method for testing a Device Under Test, DUT, the method comprising:
emulating a Trusted Execution Environment, TEE, of the DUT by means of a software emulator in order to provide an emulated TEE;
intercepting at the DUT a call from a Rich Execution Environment, REE, of the DUT into the TEE of the DUT;
transmitting the call to the emulated TEE such that the call is processed by the emulated TEE; and
transmitting a response of the emulated TEE to the REE, the response being based on the call.

(2) The method of (1), the emulated TEE being based on extracted code of the TEE.

(3) The method of (2), the extracted code of the TEE being compiled code.

(4) The method of any one of (1) to (3), the call being intercepted at the DUT by hooking.

(5) The method of any one of (1) to (4), transmitting the call to the emulated TEE comprising:
receiving the call from the REE;
parsing the call in order to obtain input data in a predefined data format for the emulated TEE; and
sending the input data to the emulated TEE.

(6) The method of (5), transmitting the call to the emulated TEE further comprising: packing the input data prior to sending the input data to the emulated TEE.

(7) The method of any one of (1) to (6), transmitting the response of the emulated TEE to the REE of the DUT comprising:
receiving, from the emulated TEE, output data related to the response in a predefined data format;
parsing the output data in order to obtain the response in a data format used by the REE; and
sending the response in the data format used by the REE to the REE.

(8) The method of (7), the output data from the emulated TEE being packed, and transmitting the response of the emulated TEE to the REE further comprising:
unpacking the output data prior to parsing the output data.

(9) The method of any of (1) to (8), the emulated TEE emulating hardware of the TEE, and the method further comprising:

monitoring a state of at least part of the emulated hardware of the TEE while the call is processed by the emulated TEE.

(10) The method of any of (1) to (9), the emulated TEE emulating code of the TEE, and the method further comprising:
modifying the emulated code of the TEE based on a user input such that the response is generated by processing the call with the modified code; and
monitoring a state of the DUT in response to receiving the response of the emulated TEE.

(11) The method of (10), modifying the emulated code of the TEE comprising hooking one or more functions of the emulated code.

(12) The method of (10) or (11), modifying the emulated code of the TEE comprising debugging the emulated code.

(13) The method of (10) or (11), modifying the emulated code of the TEE comprising introducing an artificial error into the emulated code of the TEE.

(14) An apparatus for testing a Device Under Test, DUT, the apparatus comprising:
interface circuitry for coupling to the DUT; and
processing circuitry coupled to the interface circuitry and configured to:
execute a software emulator for emulating a Trusted Execution Environment, TEE, of the DUT in order to provide an emulated TEE;
receive, via the interface circuitry, an intercepted call from a Rich Execution Environment, REE, of the DUT into the TEE of the DUT;
process the intercepted call by the emulated TEE; and
control the interface circuitry to transmit a response of the emulated TEE to the REE, the response being based on the intercepted call.

(15) The apparatus of (14), the emulated TEE being based on extracted code of the TEE.

(16) The apparatus of (14) or (15), the intercepted call being intercepted at the DUT by hooking.

(17) The apparatus of any one of (14) to (16), the emulated TEE emulating hardware of the TEE, and the processing circuitry being further configured to:
monitor a state of at least part of the emulated hardware of the TEE while the call is processed by the emulated TEE.

(18) The apparatus of any one of (14) to (17), the emulated TEE emulating code of the TEE, and the processing circuitry being further configured to:
modify the emulated code of the TEE based on a user input such that the response is generated by processing the call with the modified code.

(19) A non-transitory machine-readable medium having stored thereon a program having a program code for performing the method according to any one of (1) to (13), when the program is executed on a processor or a programmable hardware.

(20) A program having a program code for performing the method according to any one of (1) to (13), when the program is executed on a processor or a programmable hardware.

The aspects and features described in relation to a particular one of the previous examples may also be combined with one or more of the further examples to replace an identical or similar feature of that further example or to additionally introduce the features into the further example.

Examples may further be or relate to a (computer) program including a program code to execute one or more of the above methods when the program is executed on a computer, processor or other programmable hardware component. Thus, steps, operations or processes of different ones of the methods described above may also be executed by programmed computers, processors or other programmable hardware components. Examples may also cover program storage devices, such as digital data storage media, which are machine-, processor- or computer-readable and encode and/or contain machine-executable, processor-executable or computer-executable programs and instructions. Program storage devices may include or be digital storage devices, magnetic storage media such as magnetic disks and magnetic tapes, hard disk drives, or optically readable digital data storage media, for example.

It is further understood that the disclosure of several steps, processes, operations or functions disclosed in the description or claims shall not be construed to imply that these operations are necessarily dependent on the order described, unless explicitly stated in the individual case or necessary for technical reasons. Therefore, the previous description does not limit the execution of several steps or functions to a certain order. Furthermore, in further examples, a single step, function, process or operation may include and/or be broken up into several sub-steps, -functions, -processes or -operations.

If some aspects have been described in relation to a device or system, these aspects should also be understood as a description of the corresponding method. For example, a block, device or functional aspect of the device or system may correspond to a feature, such as a method step, of the corresponding method. Accordingly, aspects described in relation to a method shall also be understood as a description of a corresponding block, a corresponding element, a property or a functional feature of a corresponding device or a corresponding system.

The following claims are hereby incorporated in the detailed description, wherein each claim may stand on its own as a separate example. It should also be noted that although in the claims a dependent claim refers to a particular combination with one or more other claims, other examples may also include a combination of the dependent claim with the subject matter of any other dependent or independent claim. Such combinations are hereby explicitly proposed, unless it is stated in the individual case that a particular combination is not intended. Furthermore, features of a claim should also be included for any other independent claim, even if that claim is not directly defined as dependent on that other independent claim.

What is claimed is:

1. A method for testing a Device Under Test (DUT), the method comprising:
emulating a Trusted Execution Environment (TEE) of the DUT by means of a software emulator running on a device separate from the DUT in order to provide an emulated TEE;
intercepting, at the DUT, a call from a Rich Execution Environment (REE) of the DUT directed to and intended for the TEE of the DUT, the intercepting including augmenting a behavior of an OS, of one or more applications, of one or more functions, of one or more routines, or of another software component of the REE;
redirecting the call from the DUT to the emulated TEE running on the device separate from the DUT such that the call is processed by the emulated TEE; and transmitting a response of the emulated TEE from the device separate from the DUT to the REE of the DUT, the response being based on the call.

2. The method of claim 1, wherein the emulated TEE running on the device separate from the DUT is based on extracted code of the TEE.

3. The method of claim 2, wherein the extracted code of the TEE is compiled code.

4. The method of claim 1, wherein the call is intercepted at the DUT by hooking.

5. The method of claim 1, wherein redirecting the call from the DUT to the emulated TEE running on the device separate from the DUT comprises:
  receiving the call from the REE;
  parsing the call in order to obtain input data in a predefined data format for the emulated TEE running on the device separate from the DUT; and
  sending the input data to the emulated TEE running on the device separate from the DUT.

6. The method of claim 5, wherein redirecting the call from the DUT to the emulated TEE running on the device separate from the DUT further comprises:
  packing the input data prior to sending the input data to the emulated TEE.

7. The method of claim 1, wherein transmitting the response of the emulated TEE from the device separate from the DUT to the REE of the DUT comprises:
  receiving, from the emulated TEE running on the device separate from the DUT, output data related to the response in a predefined data format;
  parsing the output data in order to obtain the response in a data format used by the REE; and
  sending the response in the data format used by the REE to the REE.

8. The method of claim 7, wherein
  the output data received from the emulated TEE running on the device separate from the DUT is packed, and
  transmitting the response of the emulated TEE from the device separate from the DUT to the REE of the DUT further comprises:
  unpacking the output data prior to parsing the output data.

9. The method of claim 1, wherein
  the emulated TEE running on the device separate from the DUT emulates hardware of the TEE, and
  the method further comprises:
  monitoring a state of at least part of the emulated hardware of the TEE while the call is processed by the emulated TEE running on the device separate from the DUT.

10. The method of claim 1, wherein
  the emulated TEE running on the device separate from the DUT emulates code of the TEE, and
  the method further comprises:
  modifying the emulated code of the TEE based on a user input such that the response is generated by processing the call with the modified emulated code; and
  monitoring a state of the DUT in response to receiving the response of the emulated TEE running on the device separate from the DUT.

11. The method of claim 10, wherein modifying the emulated code of the TEE comprises hooking one or more functions of the emulated code.

12. The method of claim 10, wherein modifying the emulated code of the TEE comprises debugging the emulated code.

13. The method of claim 10, wherein modifying the emulated code of the TEE comprises introducing an artificial error into the emulated code of the TEE.

14. A non-transitory machine-readable medium having stored thereon a program having a program code for performing the method according to claim 1 when the program is executed on a processor or a programmable hardware.

15. An apparatus for testing a Device Under Test (DUT), the apparatus comprising:
  interface circuitry that is separate from the DUT and that is for coupling to the DUT; and
  processing circuitry that separate from the DUT, that is coupled to the interface circuitry, and that is configured to:
    execute a software emulator for emulating a Trusted Execution Environment (TEE) of the DUT in order to provide an emulated TEE;
    receive, via the interface circuitry, a call from a Rich Execution Environment (REE) of the DUT directed to and intended for the TEE of the DUT, the call having been intercepted at the DUT and redirected from the DUT to the interface circuitry, and the interception including augmenting a behavior of an OS, of one or more applications, of one or more functions, of one or more routines, or of another software component of the REE;
    process the intercepted and redirected call by the emulated TEE; and
    control the interface circuitry to transmit a response of the emulated TEE to the REE of the DUT, the response being based on the intercepted call.

16. The apparatus of claim 15, wherein the emulated TEE is based on extracted code of the TEE.

17. The apparatus of claim 15, wherein the call is intercepted at the DUT by hooking.

18. The apparatus of claim 15, wherein
  the emulated TEE emulates hardware of the TEE, and
  the processing circuitry is further configured to:
  monitor a state of at least part of the emulated hardware of the TEE while the call is processed by the emulated TEE.

19. The apparatus of claim 15, wherein
  the emulated TEE emulates code of the TEE, and
  the processing circuitry is further configured to:
  modify the emulated code of the TEE based on a user input such that the response is generated by processing the call with the modified emulated code.

\* \* \* \* \*